US006239886B1

(12) United States Patent
Klassen et al.

(10) Patent No.: US 6,239,886 B1
(45) Date of Patent: May 29, 2001

(54) METHOD AND APPARATUS FOR CORRECTING LUMINANCE AND CHROMINANCE DATA IN DIGITAL COLOR IMAGES

(75) Inventors: R. Victor Klassen; Thyagarajan Balasubramanian, both of Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/004,295

(22) Filed: Jan. 8, 1998

(51) Int. Cl.[7] ....................................................... G03F 3/08
(52) U.S. Cl. ............................................ 358/518; 358/520
(58) Field of Search ..................................... 358/518, 500, 358/504, 505, 515, 516, 517, 519, 520, 525; 382/162, 167; 345/154, 150

(56) References Cited

U.S. PATENT DOCUMENTS

| | | | |
|---|---|---|---|
| 4,275,413 | 6/1981 | Sakamoto et al. | 358/80 |
| 4,656,515 | 4/1987 | Christopher | 358/183 |
| 5,060,060 | 10/1991 | Udagawa et al. | 358/80 |
| 5,067,010 | 11/1991 | Ishii et al. | 358/13 |
| 5,278,678 | 1/1994 | Harrington | 358/518 |
| 5,377,025 | 12/1994 | Spaulding et al. | 358/518 |
| 5,416,614 | 5/1995 | Crawford | 358/530 |
| 5,428,465 | 6/1995 | Kanamori et al. | 358/518 |
| 5,450,216 | * 9/1995 | Kasson | 358/518 |
| 5,477,345 | 12/1995 | Tse | 358/500 |
| 5,504,821 | * 4/1996 | Kanamori et al. | 382/167 |
| 5,544,284 | * 8/1996 | Allebach et al. | 345/431 |
| 5,581,376 | 12/1996 | Harrington | 358/518 |
| 5,592,591 | * 1/1997 | Rolleston | 358/1.5 |
| 5,668,890 | * 9/1997 | Winkelman | 382/167 |
| 5,818,960 | 10/1998 | Gregory, Jr. et al. | 382/167 |
| 5,841,422 | * 11/1998 | Shyu | 345/154 |
| 5,912,994 | * 6/1999 | Norton et al. | 382/283 |

FOREIGN PATENT DOCUMENTS 0 409 474   1/1991   (EP) .

OTHER PUBLICATIONS

Introduction to the Photo CD Video Coding System, Jos Timmermans (1991) vol. 15, No. 3, pp. 149–168.

* cited by examiner

Primary Examiner—Edward Coles
Assistant Examiner—Joseph R. Pokrzywa
(74) Attorney, Agent, or Firm—Michelle W. Waites; Philip E. Blair

(57) ABSTRACT

The present invention is directed to a method and apparatus for improving the efficiency of color correcting subsampled luminance and chrominance based data. More specifically, the present invention is directed to a method of applying a full conversion between color spaces for one pixel in a selected pixel block. Chrominance values are assigned to the remaining pixels based upon their luminance values relative to the luminance value of the converted pixel. The invention may be used to convert between various types of color spaces, and may be used in the processing of both device dependent and device independent data.

45 Claims, 8 Drawing Sheets

METHOD AND APPARATUS FOR CORRECTING LUMINANCE AND CHROMINANCE DATA IN DIGITAL COLOR IMAGES

The present invention is directed to a method of improving the efficiency of color correcting full resolution, averaged or subsampled luminance and chrominance based data. More specifically, the present invention is directed to a method of reducing the amount of data that is required to accurately describe a digital color image, and the processing resources required to color correct that data.

BACKGROUND OF THE INVENTION

Data reduction is required in data handling processes, where too much data is present for practical applications using the data. Generally speaking, digital images—images that have been discretized in both spatial coordinates and in brightness levels such as those acquired by scanning—are often large, and thus make desirable candidates for at least one form of data reduction. These digital images do not typically change very much on a pixel to pixel basis and have what is known as "natural spatial correlation." For example in a digital color image, it is commonly known that the required spatial resolution for chrominance data is less than the spatial resolution for luminance data. The natural spatial correlation enables reducing not only the digital image data, but the resources required by certain image processing operations on the reduced data.

Digital color images may be described in terms of the chrominance and luminance values for each pixel contained therein. It is obviously desired to reproduce color images such that the colors in the copy exactly, or at least closely match the corresponding colors in the original image. Since image input and output devices are often quite different, reproducing an accurate color image often requires some form of color correction to be applied to the chrominance and luminance data before it is output. Color correction in digital images for a printing device is an image processing operation which may include a correction from 3-D device independent color space (e.g., $YC_rC_b$, RGB, XYZ, or L*a*b*) to a 3-D device dependent color space; and then a conversion to CMYK comprising under-color removal (UCR), gray-component replacement (GCR) and linearization processes.

The time required for color conversions such as those described above is directly proportional to the amount of data to which it is applied. Thus, it is desirable in many applications to employ some form of data reduction in order to facilitate rapid image processing. In addition to compression, subsampling schemes are used in scanners, digital copiers or other devices that are used to reproduce, store or process color documents. Briefly, a subsampling scheme involves selecting some subset of the available original image data for subsequent image processing operations. This substantially reduces the volume of data that is subsequently generated and converted, preferably with little or no impact on the appearance of the reproduced image. Any combination of luminance and chrominance data where at least one of the chrominance channels is at a reduced density is generally referred to as subsampled luminance and chrominance data.

There are various luminance-chrominance color spaces, including the CIE standard L*a*b*, and L*u*v*; and industry standard YCrCb. One could also define a simply computed luminance-chrominance space for a specific purpose. The distinguishing feature of a luminance-chrominance space is that one of the three axes represents the luminance, or lightness of the color, while the other two together represent the hue (related to the color name) and colorfulness or purity. For simplicity, we use LCrCb to mean any luminance chrominance space with L as the luminance channel and Cr and Cb as the other two channels, which represent the difference R-G of the amount of red and green, and the difference B-Y of the amount of blue and yellow respectively that is present in the image at a given pixel.

The present invention may be used to reduce the resources required to reproduce a digital color image. The invention may be used when full resolution luminance and chrominance data is available, or when the data has been previously reduced using subsampling, compression or other known techniques. Rather than performing color correction on all of the pixels in an image, the method disclosed selects one pixel in each block for full conversion from the $LC_rC_b$ color space to the CMYK color space. Device values are then assigned to the remaining pixels by combining the converted device data for the selected pixel with the luminance data for the remaining pixels.

The following disclosures may be relevant to aspects of the present invention:

U.S. Pat. No. 4,275,413 to Sakamoto et al. issued Jun. 23, 1981 discloses a color space transformation where information is placed into lookup tables and stored in a memory—where the lookup table relates input color space to output color space. Sakamoto teaches a "unit cube interpolation unit" having known vertices. The lookup table is commonly a three dimensional table since color is typically defined with three variables.

U.S. Pat. No. 5,581,376 to Harrington issued Dec. 3, 1996 teaches the conversion of input device signals Rs, Gs, Bs, generated by an image input terminal, to colorimetric values Rc, Gc, Bc, the colorimetric values being processed to generate address entries into a lookup table to convert them to Cx, Mx, Yx, Kx colorant signals or any multi-dimensional output color space, which includes but is not limited to CMYK or spectral data. Values not directly mapped may be determined using tetrahedral interpolation over a hexagonal lattice where the lattice is formed by offsetting every other row in at least one dimension.

U.S. Pat. No. 5,477,345 to Tse issued Dec. 19, 1995 relates to subsampling processors and a three color sensor array that may be employed to supply subsampled chrominance data to a printing machine, a computer memory device or other device.

U.S. Pat. No. 5,067,010 to Ishii et al. issued Nov. 19, 1991 discloses a color video signal processing device in which pixels are thinned out for a whole picture plane with respect to each of two kinds of digital color difference signals in accordance with a predetermined role. The encoding is executed on a unit basis of a block consisting of (n×m) samples where (n and m are integers no less than 2) which are formed with respect to each of the two kinds of color difference signals whose pixels have been thinned out or a block consisting of (n×m) samples formed so as to include both of the two kinds of color difference signals whose pixels had been thinned out. The data compression is executed on a block unit basis.

U.S. Pat. No. 4,656,515 to Christopher issued Apr. 7, 1987 discloses a television display including circuitry for reducing the amount of memory needed to hold one field of the reduced size image. In the display apparatus, digital samples representing the large and small picture signals are developed at substantially equal rates by separate circuitry. Subsampling circuitry stores one out of every five of the samples representing a horizontal line of the small picture. These samples are displayed, synchronous with the large picture at a rate three-fifths times the display rate of the large picture samples to produce an apparent size reduction of one-third in the horizontal direction.

Pending U.S. patent application Ser. No. 08/537,056 by deQueiroz et al. titled Fast Preview Processing for JPEG Compressed Images filed Sep. 29, 1995 and assigned to the assignee of the present invention discloses a method of rapidly decompressing a document image compressed using transform coding for scaling and previewing purposes. A fast algorithm is derived by utilizing a fraction of all available transform coefficients representing the image. The method is particularly efficient using the discrete cosine transform which is used in the JPEG ADCT algorithm. In JPEG ADCT, a very fast and efficient implementation is derived for a resolution reduction factor of 16 to 1 (4 to 1 in each direction) without needing any floating point arithmetic operations.

Pending U.S. patent application Ser. No. 08/721,130 by deQueiroz titled Method and Apparatus for Processing of a JPEG Compressed Image filed Sep. 26, 1996 and assigned to the assignee of the present invention discloses a method and apparatus for processing images that have been compressed using a discrete cosine transform operation, and particularly JPEG compressed images. In a preferred embodiment, the rotation of image blocks is accomplished by sign inversion and transposition operations to accomplish intrablock operations. Subsequently, one of a number of alternative methods is employed to accomplish the same image processing on an interblock level, thereby enabling the rotation or mirroring of compressed images. The two stage process allows the use of either a standardized JPEG system with enhancements or a hybrid processing method, thereby accomplishing the image processing in conjunction with compression or decompression operations and minimizing the need for large memory buffers to accomplish the image processing. Accordingly, the technique has application to any number of systems, including digital printers and copiers where there may be a necessity to orthogonally rotate or mirror the digital image.

Pending U.S. patent application Ser. No. 08/770,765 by Klassen et al. titled Color Correction of a Compressed Image filed Dec. 19, 1996 and assigned to the assignee of the present invention discloses a method for color correcting digital images that have been compressed. In a preferred embodiment, aspects of the color correction are carried out on the compressed image data to improve computational efficiency. One of a number of alternative methods is employed to accomplish the color correction on lossy or losslessly compressed images. The color transformation process accomplishes color correction on compressed image data in conjunction with compression or decompression operations. A second, simplified phase of the color correction may be applied subsequently to the decompressed image data in certain embodiments. Accordingly, the technique has application to any number of color imaging systems, including digital printers and copiers where there is a necessity to color correct compressed digital images.

Cross reference is made to concurrently filed U.S. Patent Application also entitled Method and Apparatus for Correcting Luminance and Chrominance Data in Digital Color Images, by Klassen et al., assigned to the assignee of the present invention, and identified as D/97120Q discloses a method and apparatus for improving the efficiency of color correcting luminance and chrominance based data. More specifically, the invention is directed to a method of applying a full conversion between color spaces for one pixel in a selected pixel block. Chrominance values are assigned to the remaining pixels based upon their luminance values relative to the luminance value of the converted pixel. The invention may be used to convert between various types of color spaces, and may be used in the processing of both device dependent and device independent data.

All of the references cited herein are incorporated by reference for their teachings.

Accordingly, although known apparatus and processes are suitable for their intended purposes, a need remains for a method of improving the efficiency of color correcting luminance and chrominance based data that will be provided to an image processing system.

SUMMARY OF THE INVENTION

In accordance with one aspect of the invention there is provided a method of correcting device independent luminance and chrominance data in a digital color image, which includes the steps of: providing device independent color image signals to a plurality of channels in a device independent color space, the device independent color image signals corresponding to color signals which have been generated in an input device dependent color space; deriving a set of device independent master signals from the device independent color image signals, the device independent master signal set including a signal from each of the channels; mapping the device independent master signal set to an output device dependent master signal set in an output device dependent color space; defining output device dependent color image signals corresponding to a subset of the device independent color signals; and converting the output device dependent color image signals to output device dependent coordinate signals which correspond to output device colorants.

In accordance with another aspect of the invention there is provided a method of correcting device independent luminance and chrominance data in a digital color image, which includes the steps of: providing device independent color image signals to a plurality of channels in a device independent color space, the device independent color image signals corresponding to color signals which have been generated in an input device dependent color space; deriving a set of device independent master signals from the device independent color image signals, the device independent master signal set including a signal from each of the channels; mapping the device independent master signal set to an output device dependent master signal set in an output device dependent color space; defining output device dependent color image signals corresponding to a subset of the device independent color signals; and converting the output device dependent color image signals to output device dependent coordinate signals which correspond to output device colorants, wherein the device independent color image signals have been produced by generating input device dependent color image signals in an input device dependent color space, followed by processing the input device dependent color image signals to produce device independent color image signals in a device independent color space.

In accordance with yet another aspect of the invention there is provided a method of correcting device independent luminance and chrominance data in a digital color image, comprising the steps of: providing device independent color image signals to a plurality of channels in a device independent color space, the device independent color image signals corresponding to color signals which have been generated in an input device dependent color space; deriving a set of device independent master signals from the device independent color image signals, the device independent master signal set including a signal from each of the channels; mapping the device independent master signal set to an output device dependent master signal set in an output device dependent color space; defining output device dependent color image signals corresponding to a subset of the device independent color signals; and converting the output device dependent color image signals to output device dependent coordinate signals which correspond to output device colorants.

In accordance with still another aspect of the invention there is provided an apparatus for correcting device independent luminance and chrominance data in a digital color image, which includes: means for providing device independent color image signals to a plurality of channels in a device independent color space, the device independent color image signals corresponding to color signals; means for deriving a set of device independent master signals from the device independent color image signals, the device independent master signal set including a signal from each of the channels; means for mapping the device independent master signal set to an output device dependent master signal set in an output device dependent color space; means for defining output device dependent color image signals corresponding to a subset of the device independent color signals; and means for converting the output device dependent color image signals to output device dependent coordinate signals which correspond to output device colorants.

The present invention deals with a basic problem in digital image processing systems—the memory and computationally intensive operations of image processing, particularly color correction. One embodiment of the invention accomplishes color conversion of an image segment or block by applying full color conversion techniques presently known in the art to only a small subset of the pixels in the image segment being processed. Device values are assigned to the remaining pixels by combining the luminance data for those pixels with the data obtained from the full color conversion of the subset. This technique has application to any number of systems, including digital printers and copiers where there is a requirement to color correct the digital image. A machine implementing the invention can include a data or image processing system having the capability of image compression. The techniques and system described herein are advantageous because they are efficient and result in the ability to accomplish basic image processing with little additional hardware or processing as compared to other memory intensive approaches.

BRIEF DESCRIPTION OF THE DRAWINGS

Other features and advantages of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention is directed to a method of accurately reproducing color images. More particularly, the present invention is directed to a method of reducing the time spent converting luminance and chrominance data in color images to printable form.

Figure 2:
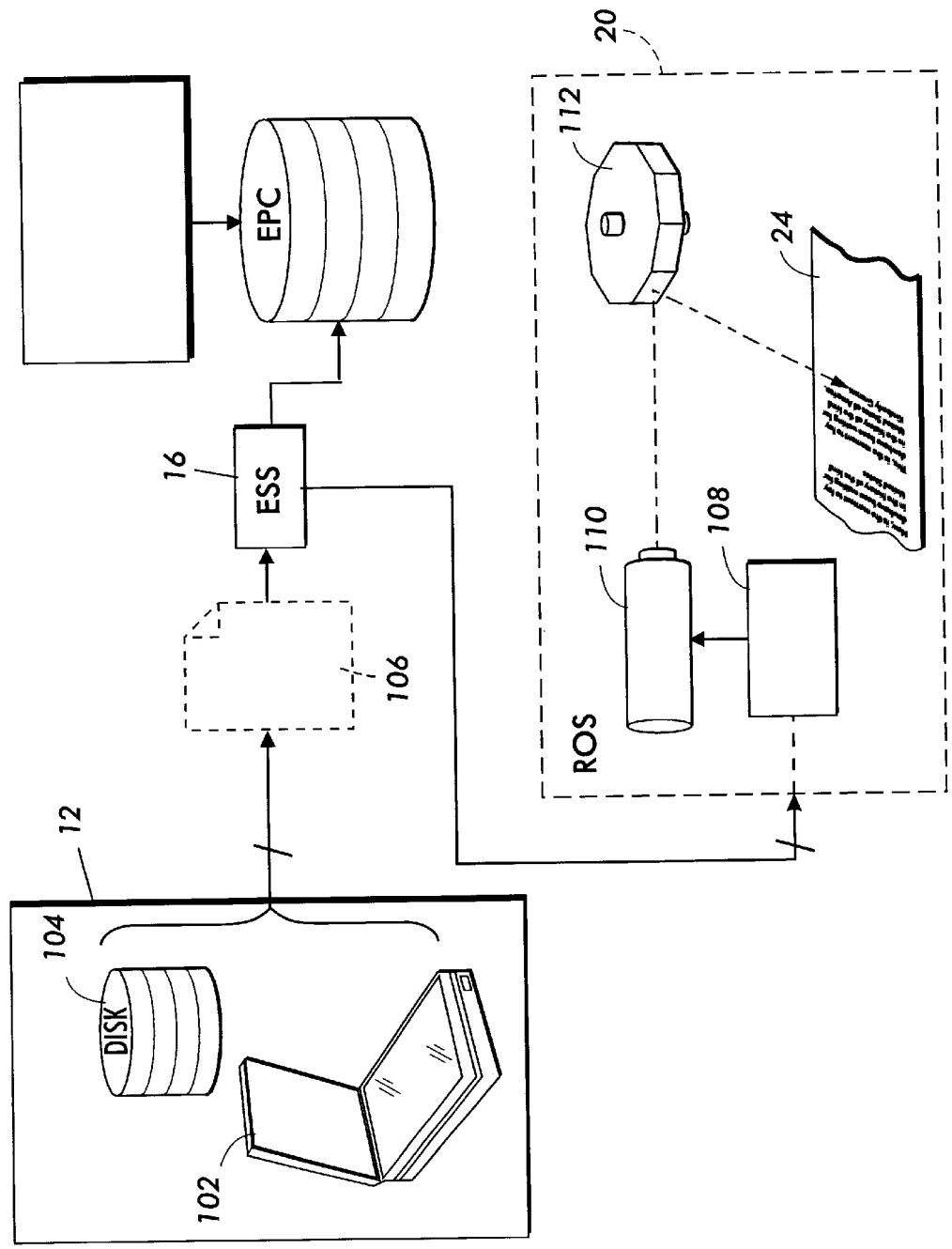
FIG. 2 is a generalized block diagram of a printing system which provides for one embodiment for the present invention.

For a general understanding of the features of the present invention, reference is made to the drawings. FIG. 2 is a block diagram of a digital color copier. The system consists of three parts: an image source 12, which may include a color scanner or a source of PDL (description language, e.g. PostScript) files; an electronic subsystem (ESS) 16, which performs various image processing operations, and in particular, color space conversions; and an output device 20, which receives data from the ESS and produces a viewable image or paper copies of the image. While the invention is described using a scanner as image source 12, other input sources are possible within the scope of this invention. In fact, while FIG. 2 illustrates a digital printing system 10 it will become evident from the following discussion that the present invention is equally well suited for use in a wide variety of copying and printing systems, including color scanners coupled with printing systems, image memory storage systems and other devices, and therefore are not limited in application to the particular systems shown herein.

Image source 12 commonly stores and transmits color information in a device-dependent form (specific to that input device), although it may convert it to device-independent form before transmission. Output device 20 requires data in a different device—dependent form (specific to the output device). The color space conversions required of ESS 16 include a possible conversion to device-independent form, and a conversion to (output) device dependent form.

Figure 1:
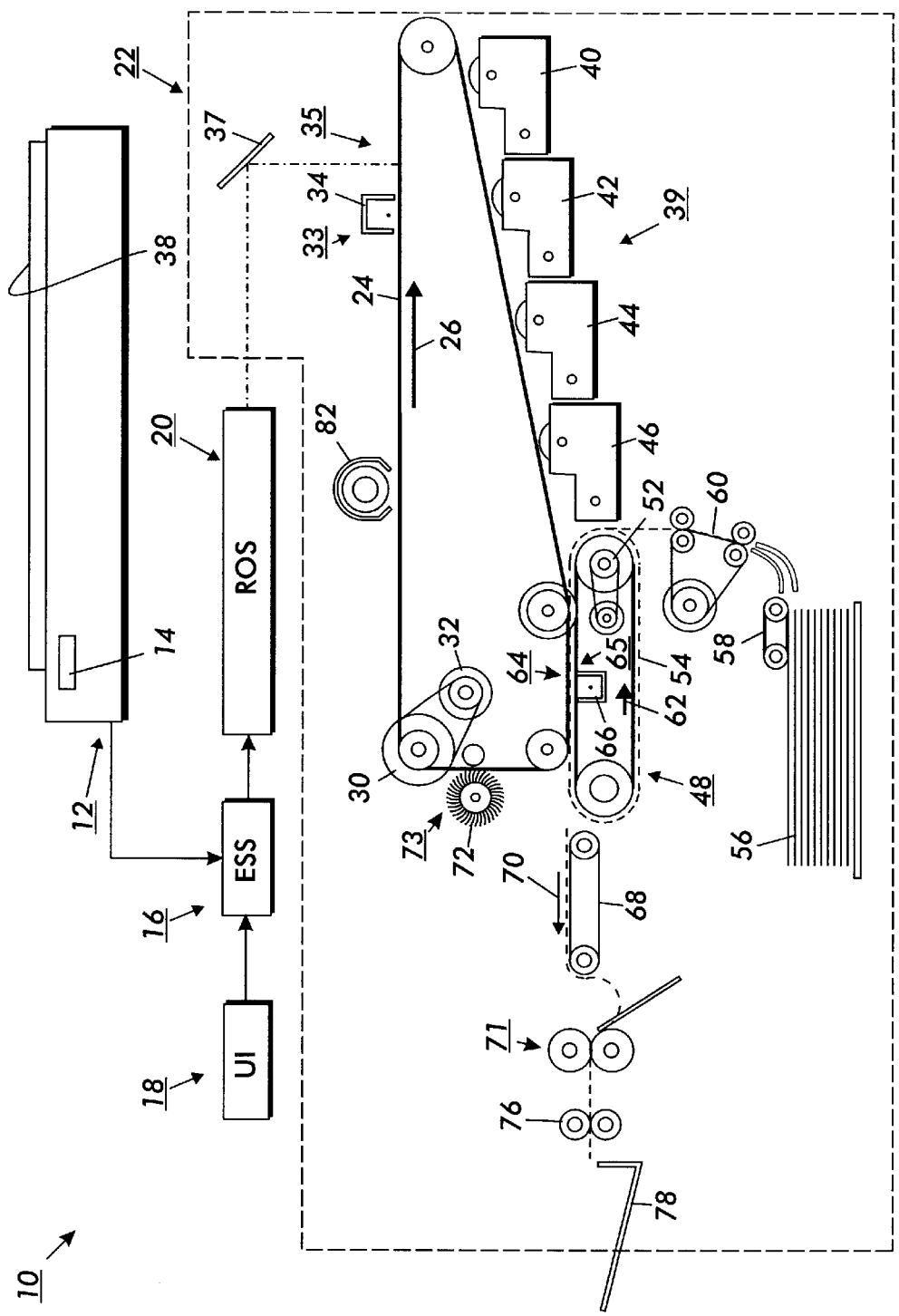
FIG. 1 is a schematic elevational view showing an electrophotographic printing machine which incorporates features of the present invention.

Referring now to FIG. 1, during operation of the printing system 10, a multiple color original document 38 is positioned on an image input terminal (IIT) indicated generally by reference numeral 12, such as a raster input scanner (RIS). IIT 12 may include any number of image sources suitable for generating or otherwise providing a digital document, such as illumination lamps, optics, a mechanical scanning drive, and a charge coupled device (CCD array) or full width subsampling scanning sensor array 14. IIT 12 captures the entire image from original document 38 and among other things, measures a set of primary color reflectances, i. e. red, green and blue reflectances, at each point of the original document. IIT 12 may convert these reflectances to device independent coordinates, including possibly a luminance-chrominance space, which we denote LCrCb.

IIT 12 transmits image data as electrical signals to an image processing system (ESS), indicated generally by the reference numeral 16. ESS 16 converts the image data signals provided by IIT 12 to a set of device independent, luminance-chrominance (LCrCb) coordinates (in the case it receives them in this form this is a trivial operation).

ESS 16 also contains data control electronics that prepare and manage the image data flow to a raster output scanner (ROS), indicated generally by the reference numeral 20. A user interface (UI), indicated generally by the reference numeral 18, is in communication with ESS 16, to enable an operator to control the various operator adjustable functions. Ul 18 may be a touch screen, or any other suitable control panel, providing an operator interface with the system. The output signal from UI 18 is also transmitted to ESS 16. The ESS then transmits signals corresponding to the desired image to ROS 20, which creates the output copy image. ROS 20 includes a laser with rotating polygon mirror blocks. Via mirror 37, ROS 20 illuminates the charged portion of photoconductive belt 24 of a printer or marking engine, indicated generally by the reference numeral 22, at a rate of about 400 pixels per inch, to achieve a set of subtractive primary latent images. ROS 20 will expose the photoconductive belt to record three or four latent images which correspond to the signals transmitted from ESS 16. One latent image is developed with cyan developer material, another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

Development of the images is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles used to develop the various latent images is adapted to absorb light within a preselected spectral region of the electromagnetic wave spectrum. By combining the different toners in various ratios, all printable colors are produced. Prior to printing, the image is divided into separations, that is, separate images, one per colorant. For example, in an image containing a green region, the corresponding region of the yellow and cyan separations will indicate a high value of colorant to be used, while the magenta separation will indicate a low value of colorant for the same region.

Each of the electronic images corresponding to separations is successively converted to an electrostatic latent image through digital readout mechanisms, digital to analog converters, and various analog electronics and mechanical means unrelated to this invention. In the example of the green region, when the yellow or cyan latent image is being formed, an electrostatic latent image formed by discharging the portions of charge on the photoconductive belt corresponding to the green regions of the original document will record the green portions as areas of relatively high charge density on photoconductive belt 24, while the same green regions will be reduced to a voltage level ineffective for development when the latent image for the magenta separation is being formed. The charged areas are then made visible by having developer unit 40 apply cyan and yellow (red and blue absorbing, respectively) toner particles onto the electrostatic latent image recorded on photoconductive belt 24. Because red and blue are absorbed, only light in the green region of the spectrum is reflected, creating the impression of a green color when the print is viewed. Similarly, other colors are formed by setting various levels and combinations of the different voltages at each location in the latent images corresponding to the different separations. Developer unit 46 contains black toner particles and may be used to develop the electrostatic latent image formed from a black and white original document, or to develop the image for a black (K) separation in four-color printing. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

Referring back to FIG. 2, system 10 includes an image input terminal (IIT) 12 that may include any number of image sources such as color scanner 102 or storage medium (disk) 104 suitable for generating or otherwise providing a digital document 106. The electrical signals output by IIT 12 may be described as a "digital document" 106 containing a "digital image." Digital document 106 is provided to the image processor that forms a part of the printing system. While preferably providing additional functionality, ESS 16 carries out the image processing and operations in accordance with the present invention. Laser driver 108 is driven in accordance with image signals entered into and processed by electronic subsystem ESS 16.

Still referring to FIG. 2, ROS 20 will preferably serve as the image output terminal (IOT). Again, ROS 20 includes a laser driving circuit 108 that controls or modulates laser 110 in accordance with decompressed, color corrected digital data produced by ESS 16. As discussed above, one or more lasers in the ROS-based IOT is used to illuminate or expose photoreceptor 24 by reflecting the laser generated light beam off of the plurality of surfaces found on rotating polygon 112 so as to create, by scanning, a latent image on member 24.

Once the latent image is produced, it can be developed as described with reference to FIG. 1, or it may be employed to drive or otherwise control any number of image output terminals, particularly color output devices where the data representing an image typically includes at least four color separations (e.g., cyan, magenta, yellow and black) each processed and stored as a separate image plane or in luminance-chrominance form to further reduce storage requirements.

When subsampled data is provided to the image processing system, the luminance data will preferably be stored and transmitted at its original spatial density while the chrominance channels will be stored and transmitted at half the original spatial density or less. Again, while the present invention may be used to process subsampled data, full resolution data may also be provided and the invention is not limited to this embodiment. However, processing sub-sampled data will typically produce faster results, and will often be preferred. Generally speaking, a subsampling system employs three video channels, including luminance channel, L and two chrominance channels Cr and Cb (which may be multiplexed into one channel). The output of luminance L channel is at the full resolution of the scanner and is relied upon to provide luminance intensity and edge information. The spatial sampling resolutions of chrominance channels Cr and Cb are equal to some fractions of the luminance in both fast and slow scan direction.

COLOR CORRECTION

Color correction is the process of converting data between color spaces which may be device dependent or device independent. Preferably, a scanner provides data in a scanner device dependent space, while a printer receives data in a printer device dependent space. Data may be converted from the scanner space to a device independent, luminance-chrominance space, and then from the device independent, luminance-chrominance space to device dependent printer space. Alternatively, data may be converted directly from the scanner space to the printer space. Conversion to the intermediate, device independent space offers several advantages. First, it allows the printer to be calibrated with respect to one device independent space, regardless of the input device. The scanner may similarly be calibrated independently from the printer. Second, use of an intermediate, device independent space allows other possible image processing operations to have a known, predictable effect, regardless of the input device characteristics. Also, use of an intermediate space allows color/brightness/saturation adjustments at the user interface. Thus, when user input is not desired it is possible to alter the present invention to convert directly from a device independent color space to an output device dependent color space without the use of an intermediate space.

For purposes of describing this invention it is assumed that when an intermediate device dependent space is used, the space is a luminance/chrominance space, denoted LCrCb. Again, an LCrCb color space is used to describe a color space which has one channel, L which provides luminance or lightness data, a second channel, Cr which corresponds to the difference R-G of the amount of red and green in an image at a given pixel, and a third channel, Cb which corresponds to the difference B-Y of the amount of blue and yellow in an image at a given pixel. While the invention is described herein with reference to a LCrCb color space, it is not limited to this embodiment, and may easily be adapted for use with other color spaces.

Figure 3:
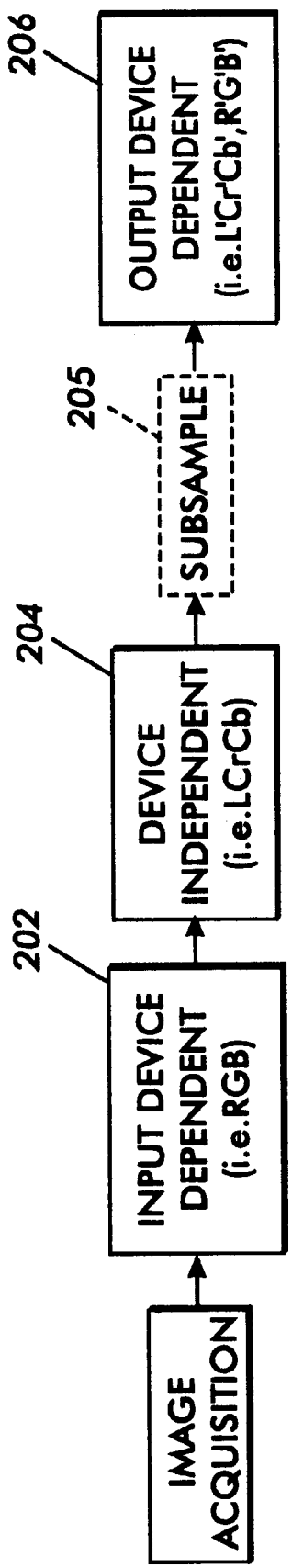
FIG. 3 contains a block diagram illustrating the steps required to convert from input device dependent color space to device-independent color space, and from device-independent color space to output device dependent color space.

Referring now to FIG. 3, consider first the conversion from input device dependent to device-independent space. Ideally, the optical filters employed are matched precisely to the human tristimulus responses. However approximations must be used since such precise matching is extremely difficult. The transformation from input device dependent (I.e. RGB) in step 202 to a device independent luminance-chrominance space LCrCb at step 204 is accomplished by some combination of matrix operations, 3D Lookup tables and tone correction curves.

Next consider the conversion from device-independent space 204 to printer space 206. First, it should be noted that the present invention is capable of handling data that has been provided at full resolution, or that has been subsampled as shown in step 205. When full resolution data is provided, step 205 is merely skipped. It should also be noted that when it does occur, subsampling may take place as shown, or may occur somewhere within step 202, within step 204, or between steps 202 and 204, and is not limited to post-processing of device independent data between steps 204 and 206.

Referring for a moment to FIG. 2, imaging data from IIT 12 is generally provided to ESS 16 where tetrahedral interpolation processing is performed to complete the color correction transformation. The color correction operation may be generally characterized as a function that maps a set of device independent or visually based color coordinates (e.g. $YC_rC_b$, RGB, XYZ, L*a*b*) to a corresponding set of device dependent coordinates (e.g. L'Cr'Cb'R'G'B', CMY). Due to the complex nature of this function, it is usually implemented as a three dimensional (3-D) lookup table with 3-D interpolation. However, the lookup table method is motivated entirely by efficiency.

One way of computing the amounts of the different separations to use at a pixel is a simple color conversion. Color conversion assumes an ideal printer that, when given a request for (say) 25% cyan, 75% magenta and no yellow or black, will produce a color that absorbs exactly 25% of the red light and 75% of the green light striking it. That is, it reflects all the blue, 75% of the red, and 25% of the green light. The process consists of computing cyan from red as c=1−r, magenta from green as m=1−g, and yellow from blue as y=1−b. Optionally black may be computed as a function of the minimum of (c, m, and y) and a compensating amount removed from these separations, to compensate for the added black colorant. The addition of black and compensating reduction in c, m, and y are known as UCR and GCR (undercolor removal and grey component replacement)

Simple color conversion fails due to non-linearities in the printing process, and the realities of chemically created colorants that do not absorb exactly the set of colors they theoretically should. A first improvement to color conversion applies tone curve corrections to the four separations after the values of r, g and b have been converted to c, m, y and k (with or without UCR and GCR). This results in a satisfactory starting point. If the C, M, Y tone correction is neutral balanced, this results in a first order luminance correction in the vicinity of the neutral region of color space. With no further correction, non-neutral colors are generally in the right area of the color space, but still differ from the desired colors by significant amounts. The color conversion as described thus far effectively provides a predictable conversion from an input color space (such as the RGB space used in the example) to the final print-ready CMYK. While the RGB color space is specifically referred to here, any input color space can be used, as long as there is a formula for converting from it to CMY, and a method for computing K from CMY. The input color space for this process is different from standard color spaces, in that it depends on the printing process and colorants used: if these change, the formula stays the same, and hence the color produced when a given RGB triple is specified will change. Because the color produced for a given RGB triple depends on the printer and its colorants, it is called a "device dependent" color space.

Full color correction in digital images is an image processing operation for which each pixel in the image first requires a correction from 3-D device independent color space (e.g., $YC_rC_b$, RGB, XYZ, or L*a*b*) to a 3-D device dependent color space (such as device RGB or CMY) when the intermediate space is used. Next, a conversion to CMYK takes place, comprising under-color removal (UCR), gray-component replacement (GCR) and linearization processes. It will be appreciated, however, that for some devices, not all of the processes in the CMYK conversion are required. For example, three color devices do not need the UCR/GCR stage. Typically, the two color correction steps are accomplished in a single operation using a three-dimensional look-up table carrying out three-dimensional interpolation such as that described in U.S. Pat. No. 5,581,376 to Harrington. However, the color correction process may also be represented as the combination of two phases: a 3—3 color space correction (e.g., RGB - R'G'B') followed by a device-dependent color space transformation operation (e.g., R'G'B'-CMYK for four color devices). The ability to separate the color correction process into these two steps forms the basis for the present invention, where the more difficult of the two steps, namely the first color correction, can be performed on a substantially smaller amount of digital data so as to significantly expedite the overall correction process. The advantage is that the 3—3 color correction operation may be performed on approximately 25% of the previously required information.

Color correction in the normal case consists of mapping three dimensional device independent color coordinates (LCrCb) to four dimensional (CMYK) coordinates using table look-up and tetrahedral interpolation. The present invention includes a method of performing such a color correction in two-stages—either mapping device independent color coordinates (i.e. LCrCb) to device dependent color coordinates (i.e. L'Cr'Cb'), and then converting the device dependent color coordinates to device dependent colorant coordinates (i.e. CMYK), or mapping input device dependent color coordinates (i.e. RGB) to output device dependent coordinates (i.e. R'G'B') and then converting to colorant coordinates.

For a four dimensional output space (i.e. CMYK), standard tetrahedral interpolation first requires 3 one dimensional lookups—one for each of the three input coordinates—to determine the indices in the three dimensional table, that is, the subcube in three dimensional color space that contains the input color. Then, on average, 2.5 comparisons are performed to determine the enclosing tetrahedron within the subcube.

Next, 4 thirty-two bit lookups, one for each vertex of the enclosing tetrahedron (or 16 one-byte lookups one for each of the four separations at each vertex) are required to obtain the CMYK data for the entire tetrahedron. Finally, standard tetrahedral interpolation methods require twelve multiplies and 12 adds to be performed to produce the CMYK data.

For a three dimensional output space (i.e. L'Cr'Cb'), tetrahedral interpolation still requires the initial 3 one dimensional lookups and 2.5 comparisons to find the enclosing tetrahedron. Next, 4 twenty-four bit lookups, or 12 one byte lookups, one for each of three separations at each vertex, are required to obtain device dependent luminance and chrominance data for the entire tetrahedron. Finally, standard tetrahedral interpolation methods require nine multiplies and nine adds to produce the device dependent luminance and chrominance data.

The first stage of the correction (mapping the first set of coordinates to device dependent L'Cr'Cb' or RGB coordinates), takes into account unwanted absorptions in the colorants and other 3D interactions. The device-dependent data R'G'B' or L'Cr'Cb' is further processed in accordance with well-known techniques to produce data representing a plurality of color separations, preferably at least three, for rendering by a color image output device such as a printer. Processing the data includes a simple transformation of the device dependent color coordinates to CMYK, and the processes of under color removal (UCR), where a CMY component of the image is subtracted, along with gray component replacement (GCR) where the subtracted CMY is replaced, in part, by a black or "K" component. Moreover, the second phase processing may include linearizing the color separations or similar processing to adjust the tonal reproduction of the output image produced in response to output data 120 (e.g., CMYK).

As previously explained, tetrahedral interpolation as described above normally requires each of the above described operations to be performed on every pixel contained within the image. This requires dedicating a very large amount of computer time or chip space to color correction, thereby limiting that which can be provided for other valuable functions. The present invention provides a method of reducing the number of pixels on which these operations are performed to one quarter or less of the original number, thus freeing up a substantial amount of computer resources.

COLOR CORRECTING SUBSAMPLED LUMINANCE CHROMINANCE DATA

It is well known that the human visual system's spatial resolution for chrominance information is less than its resolution for luminance information. More specifically, the human visual system has three opponent color pathways, one for lightness, another that, for the most part, distinguishes between red and green, and one that approximately distinguishes between blue and yellow. These pathways have bandwidths that differ approximately by a factor of four. Thus, the human eye can typically detect lightness variations at roughly four times the spatial frequency that it can detect red-green variations, and it can detect red-green variations at roughly four times the spatial frequency that it can detect those between blue and yellow. When subsampled data is provided, L, Cr and Cb are often all stored at the resolution of the luminance channel, L such that all of the provided data is preserved. Alternatively, subsampled data may be stored at two resolutions, one for luminance data L, and a second for chrominance data Cr and Cb. Subsampled data may also be stored with only L stored at the highest resolution, while Cr is stored at an intermediate resolution, and Cb at the lowest. When the data is stored at multiple resolutions, the best image reproduction will occur when the data provided by the L channel is accurate at maximum resolution, the data from the Cr channel is accurate at at least a moderate resolution, and data from the Cb channel is accurate at least once per block, or on average over the block. Again, this is all performed without a noticeable loss in image quality, due to constraints imposed by the human visual system.

While the use of three channels is described, the invention is not limited to any particular number of channels. When more than three channels are used, the multiple resolution embodiment of the invention will exhibit best results when each channel is stored at a resolution that will accurately preserve the amount of data that is detectable by the human eye. Thus four channel data may be stored at four different resolutions, five channel data at five different resolutions, etc., at the appropriate relative levels. As in the case of three channels, other multiple channel combinations do not require that the number of resolutions equal the number of channels in order to practice the invention.

The present invention is capable of operating regardless of whether the data is stored at a single resolution or at resolutions that vary with input channel. The present invention includes dividing the image into blocks, and then selecting one pixel from each block for full color conversion. The approximate values of the chrominance along with more accurate lightness/luminance data is preserved for the remaining pixels. While the invention will hereinafter be described with reference to a two by two block of pixels, that is, a block that has two pixels extending in the horizontal direction and two extending in the vertical direction, the invention is not limited to this embodiment. Those of ordinary skill in the art will recognize that the invention may be used with blocks having any number of pixels extending in either direction, and that the number of pixels extending in the two directions need not be equal.

The luminance and chrominance data for four pixels in a two by two block may be described as:

$$\begin{bmatrix} L_{00}Cr_{00}Cb_{00} & L_{01}Cr_{01}Cb_{01} \\ L_{10}Cr_{10}Cb_{10} & L_{11}Cr_{11}Cb_{11} \end{bmatrix}$$

Figure 4:
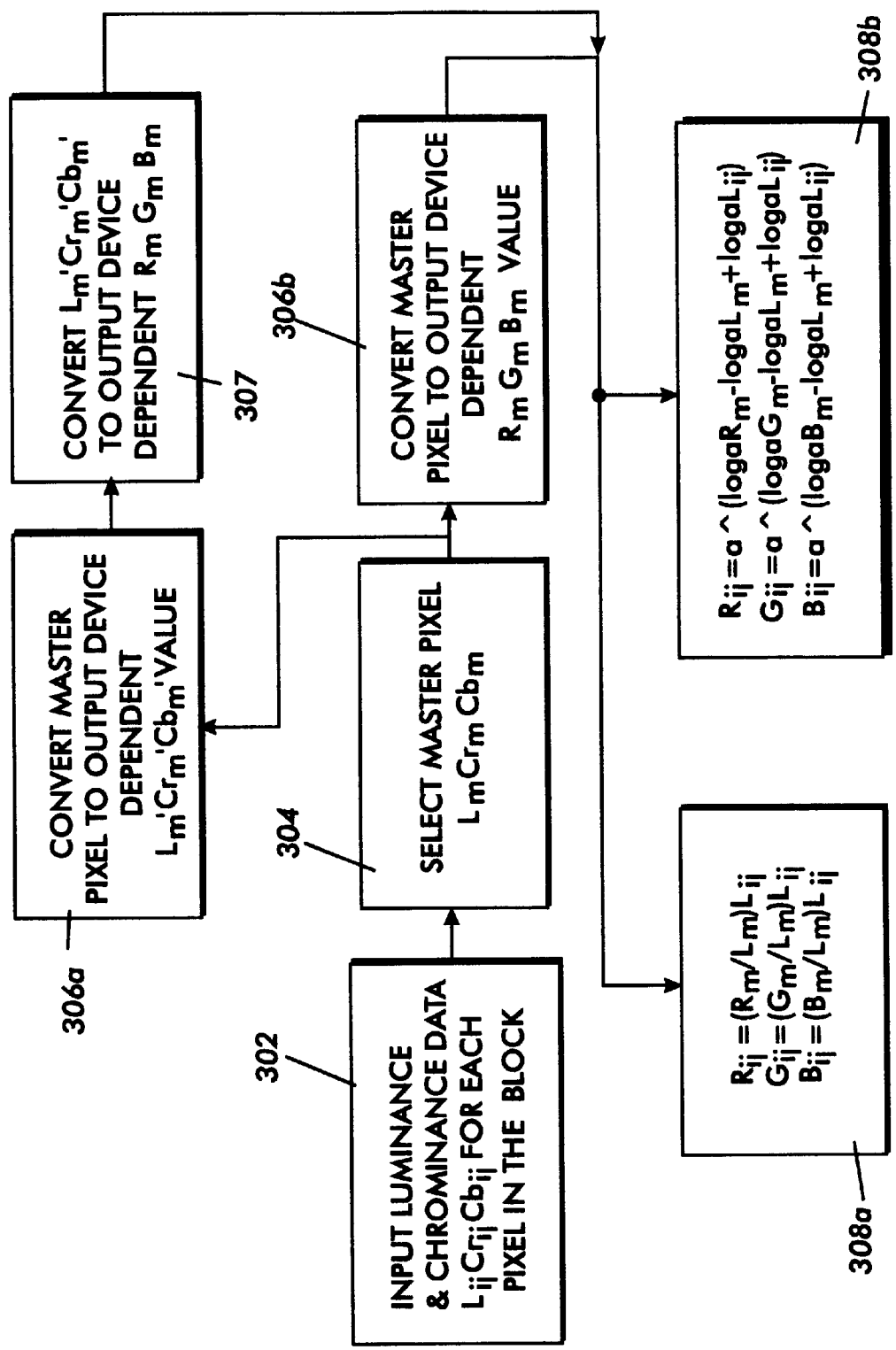
FIG. 4 contains a block diagram depicting one embodiment of the color correction method of the present invention.

Referring now to FIG. 4, in an RGB (or CMY) output space, reducing the number of pixels that will be subjected to full color conversion first requires inputting the luminance and chrominance data for all four pixels in the block $\{(L_{00}, Cr_{00}, Cb_{00}); (L_{01}, Cr_{01}, Cb_{01}); (L_{10}, Cr_{10}, Cb_{10}); (L_{11}, Cr_{11}, Cb_{11})\}$ as indicated in step 302. It should be noted here that blocks must be described somewhat differently when LCrCb data is stored at varying resolutions, than they will when data is stored at two resolutions. For example, when the image is to be printed at a resolution of 600 spots per inch (spi), L must be provided at 600 spi, while Cr may be provided at 300 spi and Cb at 100 spi. In such an instance, a "block" as referred to in the discussion thus far, would have 6×6 size, and would contain four "sub-blocks," each of which is has a 3×3 size. Thus, as described above, full information is provided for the L channel at each pixel, for the Cr channel at each sub-block and for the Cb channel only for each block.

TWO RESOLUTION DATA

Generally speaking the present invention requires selecting a master pixel for each block, and applying a full look up table color conversion to transform the master pixel to output device dependent color space (L'Cr'Cb', R'G'B') to the master pixel. Chrominance values, which are scaled by the relative luminance values of each pixel are then assigned to the remaining pixels in the block to obtain the full set of output device dependent L'Cr'Cb' or R'G'B' values.

With continued reference to FIG. 4, once the luminance and chrominance data for all pixels has been input, one of the pixels must next be selected as the master pixel ($L_m$, $Cr_m$, $Cb_m$) as indicated in step 304. Several selections of the master pixel are possible. In one embodiment, the selected pixel is always the same pixel (i.e. pixel $L_{01}Cr_{01}Cb_{01}$ will always be selected). This embodiment of the invention includes the simplest method of selecting an appropriate master pixel.

In another embodiment of the invention, the master pixel will be selected based upon a designated value of L. For example, designating the pixel that has the maximum value of L as the master pixel will allow all of the luminance ratios for the selected block of pixels to lie between 0 and 1. In the alternative the pixel that has the minimum value of L, or the value of L that is nearest the average L value for the four pixels in the block may also be used as the master pixel.

In still another embodiment, a pseudo-pixel will serve as the master pixel, wherein the pseudo pixel has L, Cr, and Cb values equal to the mean L, Cr, and Cb values for the four pixels in the block. While this embodiment of the invention will be the most expensive of the suggested pixel selecting options, it will also provide the greatest amount of numerical accuracy.

Regardless of the specifications that are used to select the master pixel, the master pixel $L_m,Cr_m,Cb_m$ is converted to a corresponding output device dependent value such as $L_m'Cr_m'Cb_m'$ in step 306a, or to an $R_m,G_m,B_m$ value as indicated in step 306b. If output device dependent L'Cr'Cb' is used, and additional conversion to $R_mG_mB_m$ is required. The remaining pixels $P_{ij}$ are then assigned the RGB values. In one embodiment, those values are equal to $R_{ij}=(R_m/L_m)L_{ij}$;
$G_{ij}=(G_m/L_m)L_{ij}$;
$B_{ij}=(B_m/L_m)L_{ij}$, as indicated in step 308a, where $L_{ij}$ is the luminance value of pixel $P_{ij}$ being subjected to conversion. In another embodiment, the multiplications and divisions can be performed as indicated in step 308b, which requires computing in log space $R_{ij}=a\hat{\,}(\log_a R_m - \log_a L_m + \log_a L_{ij})$
$G_{ij}=a\hat{\,}(\log_a G_m - \log_a L_m + \log_a L_{ij})$
$B_{ij}=a\hat{\,}(\log_a B_m - \log_a L_m + \log_a L_{ij})$ in order to increase the speed of the operation. Here a is an arbitrary base. Both the exponentiation and logarithms can be performed by one-dimensional table lookup. While some precision loss will inevitably occur by computing in 8 bit log space, this loss should be insignificant because log space is density-like, and mimics the logarithmic behavior of the visual system. Again, in the preferred embodiment, the value of $L_m$, will be set equal to the ma)dmum luminance value $L_{ij}$ for all pixels in the block. However, the invention is not limited to this embodiment, and $L_m$ may be allowed to cover a wide range of numerical values.

For efficiency, the assignment of new values may be limited to only the "non-master" pixels. However it may be simpler, and thus most desirable, to perform the operation in parallel on all four pixels. Note that the ratios $R_m/L_m$, $G_m/L_m$, $B_m/L_m$ remain constant for the four pixels contained within a single block and need only be computed once. Similarly, the ratio $L_{ij}/L_m$ is invariant over color separation and thus, need only be computed once per pixel.

Figure 5:
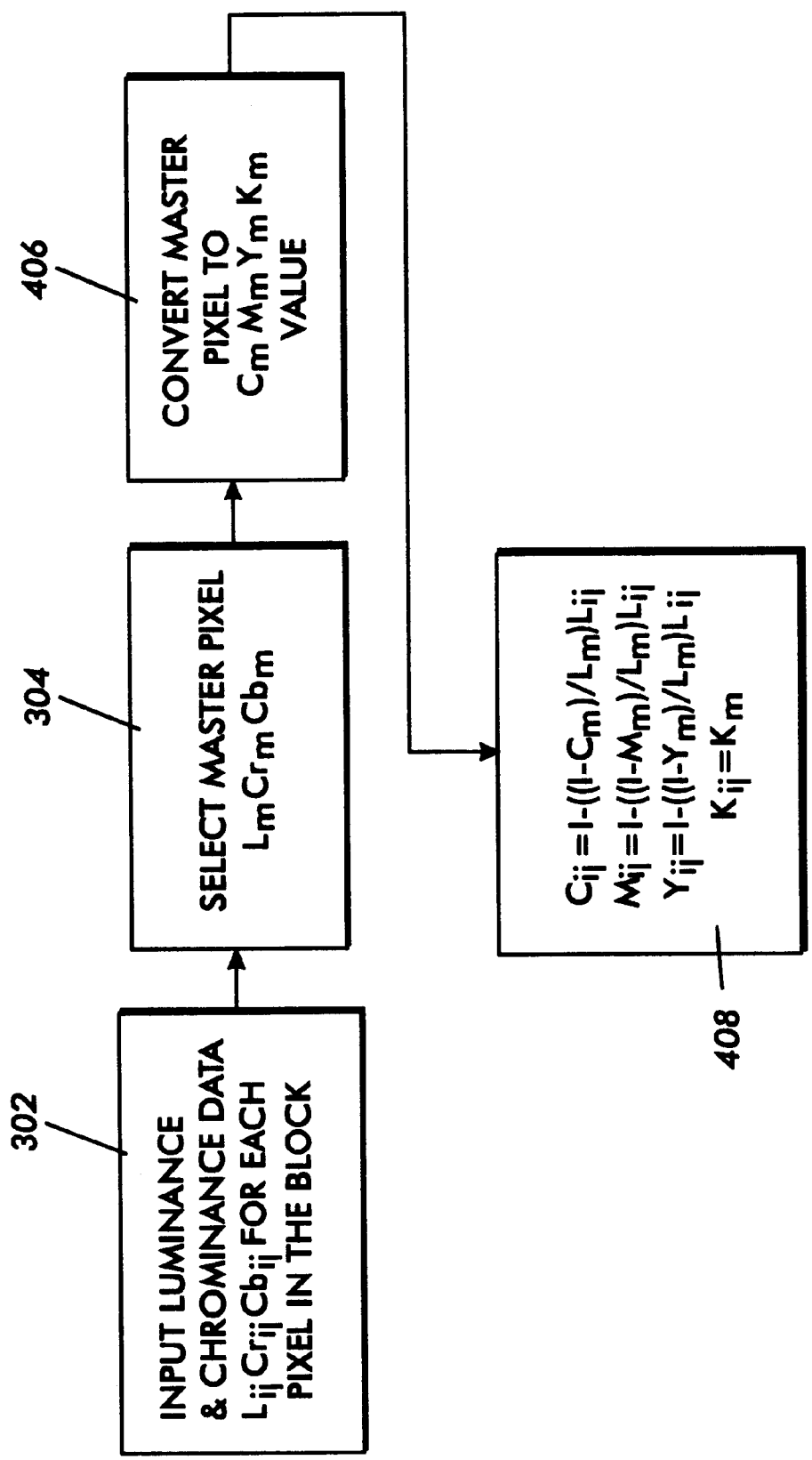
FIG. 5 contains a block diagram depicting a second embodiment of the color correction method of the present invention.

In yet another embodiment, the present invention may be used to convert device independent data to the CMYK color space as depicted in FIG. 5. It should first be noted that four colorant rendering typically involves some type of under-color removal (UCR) and gray component replacement (GCR) strategy, which establishes the relative proportions of CMY and K used to produce a given color. UCR/GCR can be very different from printer to printer, hence distinguishing this embodiment from that described with reference to FIG. 4.

When there is very little CMY subtraction, the invention should be practiced as illustrated in FIG. 5. As in the previous embodiment, luminance and chrominance data is provided for all four pixels $\{(L_{00}, Cr_{00}, Cb_{00}); (L_{01}, Cr_{01}, Cb_{01}); (L_{10}, Cr_{10}, Cb_{10}); (L_{11}, Cr_{11}, Cb_{11})\}$ as indicated in step 302, and a master pixel is selected as described above, and indicated in step 304. However as shown in step 406, one pixel is converted from ($L_m$, $Cr_m$ $Cb_m$) to ($C_m$ $M_m$ $Y_m$ $\kappa_m$) using the full 3D look up table approach. The remaining pixels are defined as, $P_{ij}$:

$C_{ij}=1-((1-C_m)/L_m)L_{ij}$;
$M_{ij}=1-((1-M_m)/L_m)L_{ij}$;
$Y_{ij}=1-((1-Y_m)/L_m)L_{ij}$ as next shown in step 408. It must be noted that a corresponding relationship cannot be used to determine the value of $K_{ij}$, since this would cause K to be introduced at an edge between two colors, neither of which contains K. Thus, $K_{ij}$ should simply be set equal to $K_m$.

Figure 6:
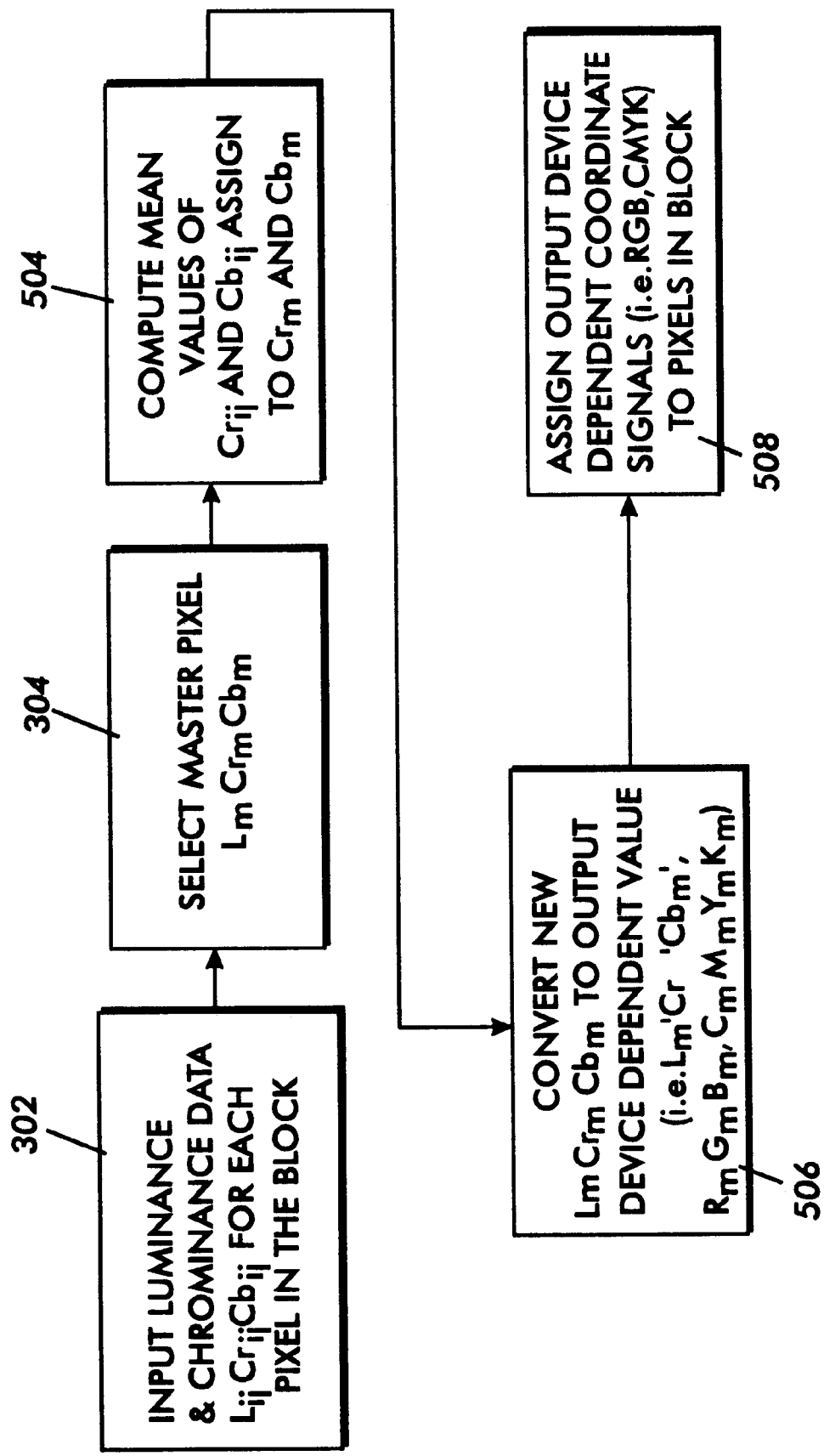
FIG. 6 contains a block diagram depicting yet another embodiment of the color correction method of the present invention.

Referring now to FIG. 6, still another embodiment of the invention includes computing $L_m$, $Cr_m$ and $Cb_m$ as the mean values of $L_{ij}$, $Cr_{ij}$ and $Cb_{ij}$ of the four pixels in the block as indicated in step 506. Using these values of $L_{ij}$, $Cr_{ij}$ and $Cb_{ij}$ would provide substantial improvements in color image quality, while reducing the tendency of the method to erode color against white edges. For example, a white pixel in a block would have highest luminance value, but zero values in both chrominance channels. If this pixel is used as the master pixel, all remaining pixels in the block will have zero chrominance. Importantly, using these values instead of the chrominance values $Cr_m$ and $Cb_m$ for the selected master pixel only requires six more addition operations for each 2×2 block, and two shift operations in the associated software. (Note: if the data is received from a system employing the JPEG architecture, the chrominance channels are sub-sampled after filtering. This means that Cr and Cb are already averaged, and this additional computation would not be needed.)

In still another embodiment of the invention, an additive correction is used:

$R_{ij}=R_m-L_m+L_{ij}$
$G_{ij}=G_m-L_m+L_{ij}$
$B_{ij}=B_m-L_m+L_{ij}$

Images generated using the present invention have been compared to those generated using conventional color correction both in terms of computational cost and image quality. In the comparison, subsampled color conversion was performed from LCrCb to CMY using the steps described above, with no color averaging. This was followed by UCR/GCR and tone reproduction curve (TRC) correction applied to the full resolution image. The proposed method was compared with conventional color conversion from LCrCb to CMYK using 3-D lookup and tetrahedral interpolation.

The following table summarizes the computational requirements per pixel. MULT=multiplies; ADD=adds; CMP=compares; LU=1-D table lookups; SHIFT=binary shifts.

| Method | MULT | ADD | CMP | LU | SHIFT |
| --- | --- | --- | --- | --- | --- |
| prior art | 12 | 14 | 2.5 | 19 | 2 |
| present invention | 2.25 | 9.75 | 3.63 | 17.1 | 0.5 |
| % savings | 81 | 30 | −45 | 11 | 75 |

As shown above, the present invention yields substantial savings in multiplication, addition and shift operations, with moderate savings in lookups, and an extra comparison operation. Yet in a comparison of two images—one generated using a conventional tetrahedral interpolation method and the other generated using the present invention, the two images were virtually indistinguishable.

MULTIPLE RESOLUTION DATA

As indicated above, the device independent values for L, Cr and Cb may be all stored at different resolutions instead of Cr and Cb being stored at the same resolution. In either case, color correction requires defining a new output device dependent color space L'Cr'Cb', from which a simple, linear transformation may be performed to obtain device dependent R'G'B' values.

Figure 7:
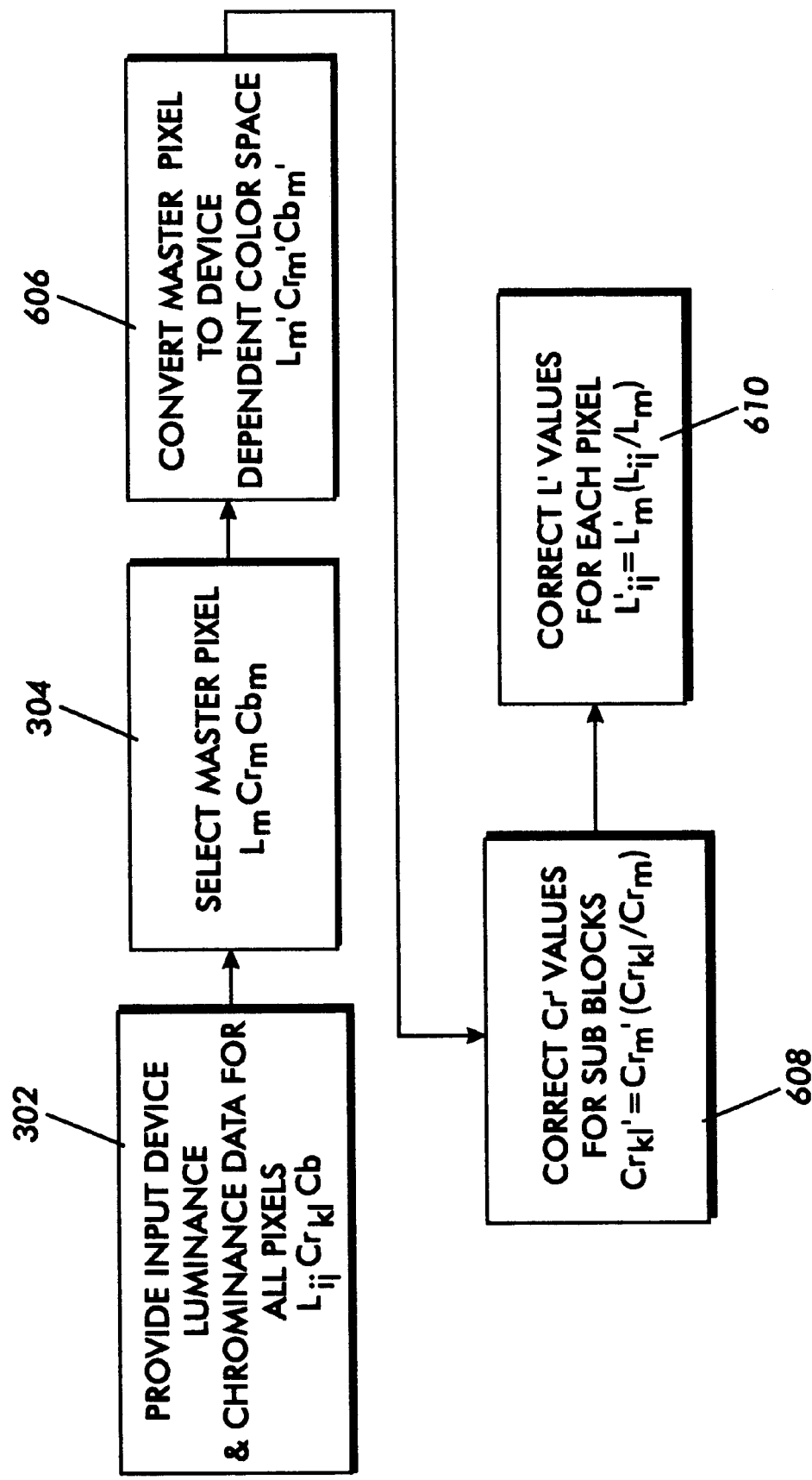
FIG. 7 contains a block diagram depicting an embodiment of the color correction method of the present invention that may be used when data is provided at multiple resolutions.

Referring now to FIG. 7, implementation of the present invention when data has been stored at varying resolutions still requires obtaining device independent L Cr Cb values for each pixel in the block as indicated in step 302 and selecting a master pixel for the block as indicated in step 304. But when varying resolutions have been provided, "sub-blocks" containing multiple pixels that have constant Cr values, will be present within each block. L values will typically continue to vary from pixel to pixel within the block, while Cb values will remain substantially constant throughout the entire block.

As in the previous embodiments, master pixel values may be selected using any one of several appropriate ways, the difference being that when multiple, rather than dual resolution data is used, the sub-blocks, rather than pixels, are used to obtain the Cr value. Once this difference is accounted for, the invention is practiced the same regardless of the resolutions at which the L Cr and Cb values have been stored. Again, one embodiment of the invention includes assigning master pixel values by selecting the same sub-block within each block to obtain the values for L and Cr, another includes selecting the sub-block based upon a desired value of Cr and/or L (i.e. maximum, minimum, nearest to average, desired combination), and still another embodiment includes creating a pseudo sub-block which has L and Cr values that equal the mean L and Cr values for the four pixels in the sub-block, or better yet, the mean Cr value for all pixels in the sub-block and the mean L value for all pixels in the block. As was the case with multiple resolution data, creating a pseudo-sub-block with the mean L and Cr values will often be the embodiment of the invention that results in the most accurate reproduction, and also the most expensive. As before, the invention is not limited to this embodiment, and the master sub-block may be chosen in many ways.

With continued reference to FIG. 7, master pixel luminance and Cr chrominance values are again designated $L_m$, $Cr_m$ and $Cb_m$. The master pixel is converted from $L_m$ $Cr_m$ $Cb_m$ color space to device dependent $L_m'$ $Cr_m'$ $Cb_m'$ color space as indicated in step 606. Sub-block locations are addressed using the indices kl, while pixel locations continue to be addressed using ij. Since the red-green chrominance value is constant only for a given sub-block, corrected $Cr_{kl}'$ values must be assigned to each sub-block, prior to further processing. $L_{ij}'$ values must be corrected for each pixel:

$Cr_{kl}'=Cr_m'(Cr_{kl}/Cr_m)$
$L_{ij}'=L_m'(L_{ij}/L_m)$

For a given sub-block, the $Cr_{kl}'$ value is corrected by multiplying the $Cr_m'$ value by the ratio of $Cr_{kl}/Cr_m$ for that sub-block as indicated in step 610. The $L_{ij}'$ value is corrected by multiplying the $L_m'$ value of each pixel by the ratio $L_{ij}/L_m$ as indicated in step 612. As in the previous case, in which Cr and Cb are stored at a common resolution, the correction for L may be performed in logarithmic space or it may be an additive correction. Scaling Cr may also be done using logarithms.

Figure 8:
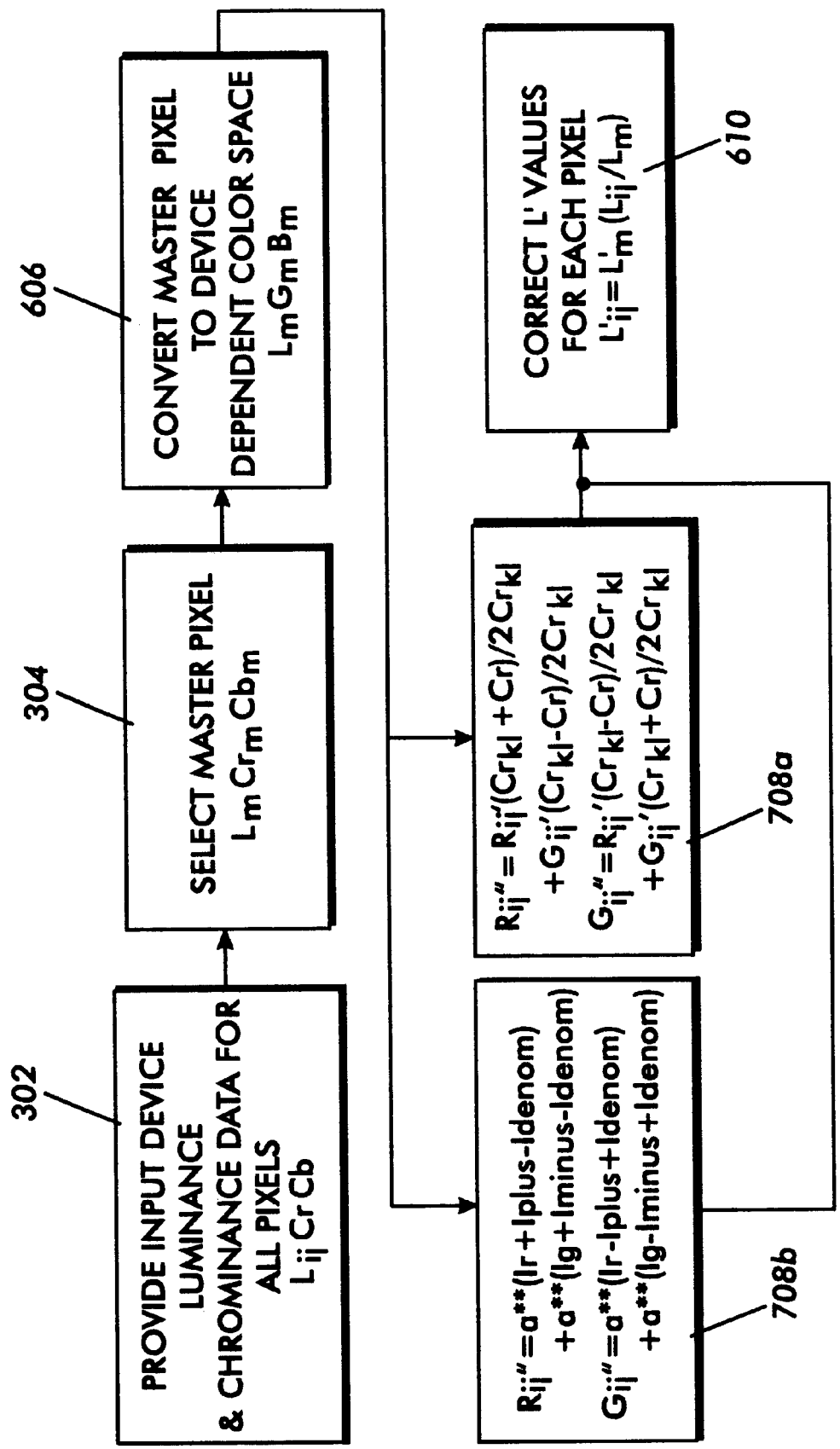
FIG. 8 contains a block diagram depicting yet another embodiment of the color correction method of the present invention that may be used when data is provided at multiple resolutions.

Referring next to FIG. 8, still another embodiment of the invention includes generating device dependent values in an R' G' B' color space rather than in an L' Cr' Cb' color space. This embodiment may be implemented whether color imaging signals are provided at single (as described above) or multiple resolutions. All that is required is a simple conversion from R' G' B' to C M Y K before printing takes place. In this embodiment of the invention, L' is scaled as before, indicated in step 610. Thus, after the separations have been adjusted on a per-block basis, the individual pixels are adjusted in one of the ways described above in the common-resolution case. However, chrominance correction occurs as indicated in steps 708a or 708b, rather than as in step 608. Thus, after defining Cr'=R'−G' and Cb'=B'−(R'+G')/2, correcting Cr' requires changing R'−G' without changing R'+G'. That is, the average is held constant while the difference is scaled. B' is unaffected since Cb is held constant over the entire block in this embodiment. As shown in step 708a, the amount of scaling is $Cr/Cr_m$ and:

$R''=R'(Cr_{kl}+Cr)/2Cr_{kl}+G'(Cr_{kl}-Cr)/2Cr_{kl}$ $G''=R'(Cr_{kl}-Cr)/2Cr_{kl}+G'(Cr_{kl}+Cr)/2Cr_{kl}$ provides the desired effect. Alternatively, the RGB multi-resolution correction may be implemented using table driven logarithms and antilogarithms as indicated in step 708b, $lr=\log_a[R']; lg=\log_a[G']$;

$lplus=\log_a[Cr_{kl}+Cr]$;

$lminus=\log_a[Cr_{kl}-Cr]$;

$ldenom=\log_a[2Cr_{kl}]$ $R''=a^{}(lr+lplus-ldenom)+a^{}(lg+lminus-ldenom)$ with a similar expression for G' (involving only the same terms, re-arranged).

The present invention may be utilized with respect to a digital copier/printing machine such as shown in FIG. 2, and/or with other devices which can use a subsampling sensor and/or processor output. While the invention has been described with reference to the various embodiments disclosed above, it is not confined to the details set forth above, but is intended to cover such modifications or changes as may come within the scope of the attached claims.

What is claimed is:

1. A method of correcting device independent luminance and chrominance data in a digital color image, comprising the steps of:
    a) providing device independent color image signals to a plurality of channels in a device independent color space, said device independent color image signals being sub-sampled and corresponding to color signals;
    b) deriving a set of device independent master signals from said device independent color image signals, said device independent master signal set including a signal from each of said channels and wherein said device independent color imaging signals have been sub-sampled and are received at three channels, a first channel L receives luminance signals at a luminance channel resolution, a second channel Cr receives red-green chrominance signals at a red-green chrominance channel resolution said red-green chrominance channel resolution being less than said luminance channel resolution, and a third channel Cb receives blue-yellow chrominance signals at a blue-yellow chrominance channel resolution, said blue-yellow chrominance channel resolution being less than said red-green chrominance channel resolution, and wherein said master signal deriving step further comprises:
        i.) dividing the digital color image into a plurality of blocks, and further dividing said blocks into a plurality of sub-blocks, wherein each block includes a plurality of signal sets that have a substantially constant blue-yellow resolution, and each sub-block includes a plurality of signal sets that have substantially constant red-green chrominance and blue-yellow resolutions:
        ii.) selecting a master sub-block; and
        iii.) choosing a signal set within said master sub-block as said master signal set;
    c) mapping said device independent master signal set to an output device dependent master signal set in an output device dependent color space;
    d) defining output device dependent color image signals corresponding to a subset of said device independent color signals wherein said output device dependent signals are created for each signal set in said block according to a luminance signal for each signal set relative to a luminance of said master signal set; and
    e) converting said output device dependent color image signals to output device dependent coordinate signals which correspond to output device colorants.

2. A method of correcting data as claimed in claim 1 wherein said device independent color image signals have been produced by generating input device dependent color image signals in an input device dependent color space, followed by processing said input device dependent color image signals to produce device independent color image signals in a device independent color space.

3. A method of correcting data as claimed in claim 1 wherein said mapping step further comprises:
    a) dividing the digital color image into blocks, each block including a plurality of device independent signal sets, wherein each signal set includes a signal from each of said channels, and wherein each block includes one master signal set; and
    b) applying a look up table conversion to transform said master signal set from said device independent color space to said output device dependent color space.

4. A method of correcting data as claimed in claim 3 wherein said master signal set deriving step further comprises designating a signal set at a given location within each block.

5. A method of correcting data as claimed in claim 3 wherein said master signal set deriving step further comprises designating a pseudo-signal that has L channel, Cr channel, and Cb channel signals equal to the mean L channel, Cr channel, and Cb channel signals for all signal sets in said block.

6. A method of correcting data as claimed in claim 3 wherein said master signal set deriving step further comprises choosing a desired relative luminance signal.

7. A method of correcting data as claimed in claim 6 wherein said chosen luminance signal is a maximum signal of all luminance signals in said block.

8. A method of correcting data as claimed in claim 6 wherein said chosen luminance signal is nearest to an average for all luminance signals in said block.

9. A method of correcting data as claimed in claim 3 wherein said output device dependent color space is an RGB space.

10. A method of correcting data as claimed in claim 9 wherein said creating step further comprises:
    a) setting output device dependent signal $R_{ij}=(R_m/L_m)L_{ij}$;
    b) setting output device dependent signal $G_{ij}=(G_m/L_m)L_{ij}$; and
    c) setting output device dependent signal $B_{ij}=(B_m/L_m)L_{ij}$ for each signal set $P_{ij}$ in said block, wherein ij denotes a location of each set within said block, $L_{ij}$ is said luminance signal of signal set $P_{ij}$, $R_m$, $G_m$, and $B_m$ are master signal set output device dependent signals and $L_m$ is said master signal set luminance signal.

11. A method of correcting data as claimed in claim 9 wherein said creating step further comprises:
   a) setting output device dependent signal $R_{ij}=a^{\wedge}(\log_a R_m - \log_a L_m + \log_a L_{ij})$;
   b) setting output device dependent signal $G_{ij}=a^{\wedge}(\log_a G_m - \log_a L_m + \log_a L_{ij})$; and
   c) setting output device dependent signal $B_{ij}=a^{\wedge}(\log_a B_m - \log_a L_m + \log_a L_{ij})$
   for each signal set $P_{ij}$ in said block, wherein ij denotes a location of each signal set within said block, $L_{ij}$ is said luminance signal of signal set $P_{ij}$, $R_m$, $G_m$, and $B_m$ are master signal set output device dependent signals and $L_m$ is said master signal set luminance signal.

12. A method of correcting data as claimed in claim 9 wherein said creating step further comprises:
   a) setting output device dependent signal $R_{ij}=R_m-L_m+L_{ij}$;
   b) setting output device dependent signal $G_{ij}=G_m-L_m+L_{ij}$; and
   c) setting output device dependent signal $B_{ij}=B_m-L_m+L_{ij}$
   for each signal set $P_{ij}$ in said block, wherein ij denotes a location of each signal set within said block, $L_{ij}$ is said luminance signal of signal set $P_{ij}$, $R_m$, $G_m$, and $B_m$ are master signal set output device dependent signals and $L_m$ is said master signal set luminance signal.

13. A method of correcting data as claimed in claim 1 wherein said output device dependent color space is an LCrCb space.

14. A method of correcting data as claimed in claim 13 wherein said creating step further comprises:
   a) setting output device dependent signal $L_{ij}'=(L_m'/L_m)L_{ij}$;
   b) setting output device dependent signal $Cr_{ij}'=(L_m'/L_m)Cr_{ij}$;
   c) setting output device dependent signal $Cb_{ij}'=(L_m'/L_m)Cb_{ij}$;
   for each signal set $P_{ij}$ in said block, wherein ij denotes a location of each set within said block, $L_{ij}$ is said device independent luminance signal of signal set $P_{ij}$, $L_m'$, is said master signal set output device dependent signal, and $L_m$ is said master signal set device independent luminance signal.

15. A method of correcting data as claimed in claim 3 wherein an output device dependent color space is a CMYK color space.

16. A method of correcting data as claimed in claim 15 wherein said defining step further comprises:
   a) setting output device dependent coordinate signal $C_{ij}=1-((1-C_m)/L_m)L_{ij}$;
   b) setting output device dependent coordinate signal $M_{ij}=1-((1-M_m)/L_m)L_{ij}$;
   c) setting output device dependent coordinate signal $Y_{ij}=1-((1-Y_m)/L_m)L_{ij}$; and
   d) setting output device dependent coordinate signal $K_{ij}=K_m$,
   for each signal set $P_{ij}$ in said block, wherein ij denotes a location of each signal set within said block $L_{ij}$ is said luminance signal of signal set $P_{ij}$, $C_m$, $M_m$, $Y_m$, and $K_m$ are master signal set device dependent color image signals and $L_m$ is a master signal set luminance signal.

17. A method of correcting data as claimed in claim 1 wherein said mapping step further comprises:
   a) applying a look up table conversion to transform said master signal set from said device independent color space to said output device dependent color space;
   b) correcting said output device dependent red-green chrominance signals for a subset of said sub-blocks; and
   c) correcting said output device dependent luminance signals for a subset of said signal sets.

18. A method of correcting data as claimed in claim 17 wherein said master sub-block selecting step further comprises designating a sub-block at a given location within each block.

19. A method of correcting data as claimed in claim 17 wherein said master sub-block selecting step further comprises creating a pseudo-sub-block that has L channel and Cr channel signals equal to the mean L channel and Cr channel signals for all signal sets in said block.

20. A method of correcting data as claimed in claim 17 wherein said master sub-block selecting step further comprises designating a desired relative red-green chrominance signal.

21. A method of correcting data as claimed in claim 20 wherein said designated red-green chrominance signal is a maximum magnitude of all chrominance red-green chrominance signals in said block.

22. A method of correcting data as claimed in claim 20 wherein said designated red-green chrominance signal is nearest to an average for all red-green chrominance signals in said block.

23. A method of correcting data as claimed in claim 17 wherein said master signal set choosing step further comprises designating a signal set at a given location within each sub-block.

24. A method of correcting data as claimed in claim 17 wherein said master signal set choosing step further comprises designating a desired relative luminance signal.

25. A method of correcting data as claimed in claim 24 wherein said designated luminance signal is a maximum signal of all luminance signals in said sub-block.

26. A method of correcting data as claimed in claim 24 wherein said designated luminance signal is nearest to an average for all luminance signals in said sub-block.

27. A method of correcting data as claimed in claim 17 wherein said output device dependent color space is an RGB space.

28. A method of correcting data as claimed in claim 27 wherein said red-green chrominance correcting step further comprises:
   a) setting $L_{ij}'=L_m'(L_{ij}/L_m)$;
   b) setting $R_{ij}'=(R_m/L_m)L_{ij}$;
   c) setting $G_{ij}'=(G_m/L_m)L_{ij}$;
   d) setting $R_{ij}''=R_{ij}'(Cr_{kl}+Cr)/2Cr_{kl}+G_{ij}'(Cr_{kl}-Cr)/2Cr_{kl}$;
   e) setting $G_{ij}''=R_{ij}'(Cr_{kl}-Cr)/2Cr_{kl}+G_{ij}'(Cr_{kl}+Cr)/2Cr_{kl}$, and
   f) setting $B_{ij}''=B_{ij}'$
   where $Cr_{ij}'=R_{ij}'-G_{ij}'$, and $B_{ij}'=Cb_{ij}'+(R_{ij}'+G_{ij}')/2$.

29. A method of correcting data as claimed in claim 27 wherein said red-green chrominance correcting step further comprises:
   a) setting $R_{ij}''=a^{}(lr+lplus-ldenom)+a^{}(lg+lminus-ldenom)$; and
   b) setting $G_{ij}''=a^{}(lr-lplus+ldenom)+a^{}(lg-lminus+ldenom)$ where $lplus=\log_a[Cr_{kl}+Cr]$, $lminus=\log_a[Cr_{kl}-Cr]$, and $ldenom=\log_a[2Cr_{kl}]$.

30. A method of correcting data as claimed in claim 17 wherein said output device dependent color space is an LCrCb space.

31. A method of correcting data as claimed in claim 30 wherein said red-green chrominance correcting step further comprises setting $Cr_{kl}'=Cr_m'(Cr_{kl}/Cr_m)$ for each sub-block, and said luminance correcting step further comprises setting $L_{ij}'=L_m'(L_{ij}/L_m)$ for each signal set, wherein kl denotes a location of each sub-block within said block, $Cr_{kl}'$ is an output device dependent red-green chrominance signal of sub-block $S_{kl}$, $Cr_m'$ is an output device dependent red-green chrominance master signal, $Cr_{kl}$ is a device independent red-green chrominance signal of sub-block $S_{kl}$, and $Cr_m$ is a device independent red-green chrominance master signal, and wherein ij denotes a location of each signal set within said block, $L_{ij}'$ is an output device dependent luminance signal of signal set $P_{ij}$, $L_m'$ is an output device dependent master signal set luminance signal, $L_{ij}$ is a device independent luminance signal of signal set $P_{ij}$, $L_m$ is a device independent master signal set luminance signal.

32. A method of correcting data as claimed in claim 17 wherein an output device dependent color space is a CMYK color space.

33. A method of correcting data as claimed in claim 32 wherein said defining step further comprises:
   a) setting output device dependent coordinate signal $C_{ij} = 1-((1-C_m)/L_m)L_{ij}$;
   b) setting output device dependent coordinate signal $M_{ij} = 1-((1C_m)/L_m)L_{ij}$;
   c) setting output device dependent coordinate signal $Y_{ij} = 1-((1-Y_m)/L_m)L_{ij}$; and
   d) setting output device dependent coordinate signal $K_{ij} = K_m$, for each signal set $P_{ij}$ in said block, wherein ii denotes a location of each signal set within said block, $L_{ij}$ is said luminance signal of signal set $P_{ij}$, $C_m$, $M_m$, $Y_m$, and $K_m$ are master signal set device dependent color image signals and $L_m$ is a master signal set luminance signal.

34. An apparatus for correcting device independent luminance and chrominance data in a digital color image, comprising:
   a) means for providing device independent color image signals to a plurality of channels in a device independent color space, said device independent color image signals corresponding to color signals;
   b) means for deriving a set of device independent master signals from said device independent color image signals, said device independent master signal set including a signal from each of said channels and wherein said device independent color image signals have been sub-sampled and are received at three channels, a first channel L receives luminance signals at a luminance channel resolution, a second channel Cr receives red-green chrominance signals at a red-green channel resolution wherein said red-green channel resolution is less than said luminance channel resolution, and a third channel Cb receives blue-yellow chrominance signals at a blue-yellow channel resolution said blue-yellow channel resolution is less than said red-green channel resolution and wherein said master signal deriving means further comprises;
      i.) means for dividing the digital color image into a plurality of blocks, and further dividing said blocks into a plurality of sub-blocks, wherein each block includes a plurality of signal sets that have a substantially constant blue-yellow resolution, and each sub-block includes a plurality of signal sets that have substantially constant red-green chrominance and blue-yellow resolutions;
      ii.) means for selecting a master sub-block; and
      iii.) means for choosing a signal set within said master sub-block as said master signal set;
   c) means for mapping said device independent master signal set to an output device dependent master signal set in an output device dependent color space wherein said mapping means further comprises:
      i.) means for dividing the digital color image into blocks, each block including a plurality of device independent signal sets, wherein each signal set includes a signal from each of said channels, and wherein each block includes one master signal set: and
      ii.) means for applying a look up table conversion to transform said master signal set from said device independent color space to said output device dependent color space;
   d) means for defining output device dependent color image signals corresponding to a subset of said device independent color signals wherein said defining means further comprises means for creating output device dependent signals for each signal set in said block according to a luminance signal for each signal set relative to a luminance of said master signal set; and
   e) means for converting said output device dependent color image signals to output device dependent coordinate signals which correspond to output device colorants.

35. An apparatus for correcting data as claimed in claim 34 wherein said providing means further comprises generating input device dependent color image signals in an input device dependent color space, followed by processing said input device dependent color image signals to produce device independent color image signals in a device independent color space.

36. An apparatus for correcting data as claimed in claim 34 wherein said creating means further comprises:
   a) means for setting output device dependent signal $R_{ij}=(R_m/L_m)L_{ij}$;
   b) means for setting output device dependent signal $G_{ij}=(G_m/L_m)L_{ij}$; and
   c) means for setting output device dependent signal $B_{ij}=(B_m/L_m)L_{ij}$ for each signal set $P_{ij}$ in said block, wherein ij denotes a location of each set within said block, $L_{ij}$ is said luminance signal of signal set $P_{ij}$, $R_m$, $G_m$, and $B_m$ are master signal set output device dependent signals and $L_m$ is said master signal set luminance signal.

37. An apparatus for correcting data as claimed in claim 34 wherein said creating means further comprises:
   a) means for setting output device dependent signal $R_{ij}=a^{(\log_a R_m - \log_a L_m + \log_a L_{ij})}$;
   b) means for setting output device dependent signal $G_{ij}=a^{(\log_a G_m - \log_a L_m + \log_a L_{ij})}$; and
   c) means for setting output device dependent signal $B_{ij}=a^{(\log_a B_m - \log_a L_m + \log_a L_{ij})}$ for each signal set $P_{ij}$ in said block, wherein ij denotes a location of each signal set within said block, $L_{ij}$ is said luminance signal of signal set $P_{ij}$, $R_m$, $G_m$, and $B_m$ are master signal set output device dependent signals and $L_m$ is said master signal set luminance signal.

38. An apparatus for correcting data as claimed in claim 34 wherein said creating means further comprises:
   a) means for setting output device dependent signal $R_{ij}=R_m-L_m+L_{ij}$
   b) means for setting output device dependent signal $G_{ij}=G_m-L_m+L_{ij}$; and
   c) means for setting output device dependent signal $B_{ij}=B_m-L_m+L_{ij}$ for each signal set $P_{ij}$ in said block, wherein ij denotes a location of each signal set within said block, $L_{ij}$ is said luminance signal of signal set $P_{ij}$, $R_m$, $G_m$, and $B_m$ are master signal set output device dependent signals and $L_m$ is said master signal set luminance signal.

39. An apparatus for correcting data as claimed in claim 34 wherein said creating means further comprises:
   a) means for setting output device dependent signal $L_{ij}'=(L_m'/L_m)L_{ij}$;
   b) means for setting output device dependent signal $Cr_{ij}'=(L_m'/L_m)Cr_{ij}$;
   c) means for setting output device dependent signal $Cb_{ij}'=(L_m'/L_m)Cb_{ij}$;
   for each signal set $P_{ij}$ in said block, wherein ij denotes a location of each set within said block, $L_{ij}$ is said device independent luminance signal of signal set $P_{ij}$, $L_m'$, is said master signal set output device dependent signal, and $L_m$ is said master signal set device independent luminance signal.

40. An apparatus for correcting data as claimed in claim 34 wherein said defining means further comprises:
   a) means for setting output device dependent coordinate signal $C_{ij}=1-((1-C_m)/L_m)L_{ij}$;
   b) means for setting output device dependent coordinate signal $M_{ij}=1-((1-M_m)/L_m)L_{ij}$;
   c) means for setting output device dependent coordinate signal $Y_{ij}=1-((1-Y_m)/L_m)L_{ij}$; and
   d) means for setting output device dependent coordinate signal $K_{ij}=K_m$,
   for each signal set $P_{ij}$ in said block, wherein ij denotes a location of each signal set within said block, $L_{ij}$ is said luminance signal of signal set $P_{ij}$, $C_m$, $M_m$, $Y_m$, and $K_m$ are master signal set device dependent color image signals and $L_m$ is a master signal set luminance signal.

41. An apparatus for correcting data as claimed in claim 34 wherein said mapping means further comprises:
   a) means for applying a look up table conversion to transform said master signal set from said device independent color space to said output device dependent color space;
   b) correcting said output device dependent red-green chrominance signals for a subset of said sub-blocks; and
   c) correcting said output device dependent luminance signals for a subset of said signal sets.

42. An apparatus for correcting data as claimed in claim 41 wherein said red-green chrominance correcting means further comprises:
   a) means for setting $L_{ij}'=L_m'(L_{ij}/L_m)$;
   b) means for setting $R_{ij}'=(R_m/L_m)L_{ij}$;
   c) means for setting $G_{ij}'=(G_m/L_m)L_{ij}$;
   d) means for setting $R_{ij}''=R_{ij}'(Cr_{kl}+Cr)/2Cr_{kl}+G_{ij}'(Cr_{kl}-Cr)/2Cr_{kl}$;
   e) means for setting $G_{ij}''=R_{ij}'(Cr_{kl}-Cr)/2Cr_{kl}+G_{ij}'(Cr_{kl}+Cr)/2Cr_{kl}$, and
   f) means for setting $B_{ij}''=B_{ij}'$
   where $Cr_{ij}'=R_{ij}'-G_{ij}'$, and $B_{ij}'=_{Cbij}'+(R_{ij}'+G_{ij}')/2$.

43. An apparatus for correcting data as claimed in claim 41 wherein said red-green chrominance correcting means further comprises:
   a) means for setting $R_{ij}''=a(lr+lplus-ldenom)+a(lg+lminus-ldenom)$; and
   b) means for setting $G_{ij}''=a(lr-lplus+ldenom)+a(lg-lminus+ldenom)$ where $lplus=\log_a[Cr_{kl}+Cr]$, $lminus=\log_a[Cr_{kl}-Cr]$, and $ldenom=\log_a[2Cr_{kl}]$.

44. An apparatus for correcting data as claimed in claim 41 wherein said red-green chrominance correcting means further comprises means for setting $Cr_{kl}'=Cr_m'(Cr_{kl}/Cr_m)$ for each sub-block, and said luminance correcting means further comprises means for setting $L_{ij}'=L_m'(L_{ij}/L_m)$ for each signal set, wherein kl denotes a location of each sub-block within said block, $Cr_{kl}'$ is an output device dependent red-green chrominance signal of sub-block $S_{kl}$, $Cr_m'$ is an output device dependent red-green chrominance master signal, $Cr_{kl}'$ is a device independent red-green chrominance signal of sub-block $S_{kl}$, and $Cr_m$ is a device independent red-green chrominance master signal, and wherein ij denotes a location of each signal set within said block, $L_{ij}'$ is an output device dependent luminance signal of signal set $P_{ij}$, $L_m'$ is an output device dependent master signal set luminance signal, $L_{ij}$ is a device independent luminance signal of signal set $P_{ij}$, $L_m$ is a device independent master signal set luminance signal.

45. An apparatus for correcting data as claimed in claim 41 wherein said defining means further comprises:
   a) means for setting output device dependent coordinate signal $C_{ij}=1-((1-C_m)/L_m)L_{ij}$;
   b) means for setting output device dependent coordinate signal $M_{ij}=1-((1-M_m)/L_m)L_{ij}$;
   c) means for setting output device dependent coordinate signal $Y_{ij}=1-((1-Y_m)/L_m)L_{ij}$; and
   d) means for setting output device dependent coordinate signal $K_{ij}=K_m$, for each signal set $P_{ij}$ in said block, wherein ij denotes a location of each signal set within said block, $L_{ij}$ is said luminance signal of signal set $P_{ij}$, $C_m$, $M_m$, $Y_m$, and $K_m$, are master signal set device dependent color image signals and $L_m$ is a master signal set luminance signal.

* * * * *